United States Patent [19]

Lemelson

[11] 4,354,189

[45] Oct. 12, 1982

[54] SWITCH AND LOCK ACTIVATING SYSTEM AND METHOD

[76] Inventor: Jerome H. Lemelson, 85 Rector St., Metuchen, N.J. 08840

[21] Appl. No.: 121,894

[22] Filed: Feb. 15, 1980

Related U.S. Application Data

[63] Continuation of Ser. No. 849,785, Nov. 9, 1977, Pat. No. 4,189,712.

[51] Int. Cl.³ ............................................. H04Q 9/00
[52] U.S. Cl. ..................... 340/825.31; 340/825.32; 340/825.33; 340/825.34; 340/543
[58] Field of Search ................... 340/542, 543, 149 A, 340/147 MD, 825.31, 825.32, 825.33, 825.34; 368/10

[56] References Cited

U.S. PATENT DOCUMENTS

| | | | |
|---|---|---|---|
| 3,662,342 | 5/1972 | Hedin | 340/542 |
| 3,733,862 | 5/1973 | Killmeyer | 340/542 |
| 4,042,970 | 8/1977 | Atkins | 340/542 |
| 4,063,410 | 12/1977 | Welling | 368/10 |

*Primary Examiner*—Harold I. Pitts

[57] ABSTRACT

A system and method are provided for opening a lock or activating a switch by electronically controlled means. In one form, a finger ring is provided which contains a code recording supported within or adjacent the crown thereof. When the hand of the person wearing the ring is held near a reading device, such as to dispose the crown within a receptacle containing the reading device, the code is automatically read and electrical signals generated thereby are applied to close or open an electrical switch or operate a motor or solenoid for opening a lock and/or drive a door to open. If the signals generated in reading the ring recording is a code, they may be applied to a comparator for operating the lock or switch if the code is an enabling code. The reading device may comprise a photoelectric cell or bank of cells adapted to read variations in reflectivity of the ring code. In another form, the ring may contain an electronic circuit or devices which generate a code in the presence of a radiation field generated in the vicinity of the receptacle for the ring upon sensing the presence of the ring. In another form, the ring may contain a battery and electronic circuit means for generating the enabling code when a switch is closed. In another form, the combination of the code generating means of the ring and a separate circuit such as a circuit card, may be required to enable the switch to close or the lock to open. Improvements are also provided in the constructions of electronic keys in the configurations of finger rings, wrist watches, cards and the like, for use in switch and lock activating systems, security and transaction systems and the like.

10 Claims, 16 Drawing Figures

SWITCH AND LOCK ACTIVATING SYSTEM AND METHOD

RELATED U.S. APPLICATION DATA

This is a continuation of application Ser. No. 849,785 filed Nov. 9, 1977 for Switch and Lock Activating System and Method, now U.S. Pat. No. 4,189,712.

SUMMARY OF THE INVENTION

This invention relates to an apparatus and method for enabling a machine to operate, a door to open or for controlling or initiating the operation of a machine or the opening of a door. The invention is particularly directed to such a system which is electronically controlled and in a preferred form, employs code generating means in the form of a coded ring to be worn by a person or subscribers to the system and an automatic means for reading the codes of the rings to cause or enable a switch, such as an automobile ignition switch or a switch for operating a machine, or a door lock to open or a door driving motor to operate to open a door. The invention is also directed to improvements in the structures of coded rings and the like for use in such systems.

The conventional key operated door lock has been in use for centuries and suffers a number of important shotcomings including its ability to be picked or opened by a master key or a duplicate key. It is also burdensome upon a person having a supply of a number of keys to find the requisite key for a particular lock, properly locate the selected key in alignment with the keyhole of the lock, insert and turn the key to open the lock. Systems have also been developed which are electronically operated but require the complex pushing of pushbuttons to sequentially close a series of switches to generate a code to effect opening of a lock, a procedure which is difficult and time consuming.

BACKGROUND OF THE INVENTION

The instant invention is directed to a simple electronic means for generating an electrical code in response to reading a recording of such code provided in the crown or alongside the crown of a finger ring to enable a switch to close or a doorlock to open or to directly effect such closure or opening when the finger ring is disposed adjacent to or the crown portion thereof within a recepticle containing electronic reading means for the code recording thereof. The code may be in the form of printed or photographic matter provided within the crown behind or within the light transmitting jewel or crown of the ring, or may also comprise castings forming part of the crown or the ring base, magnetic means, reflective elements or light sources within the ring which are activated by a battery therein or external energy supplied thereto by an energy field in the vicinity of the lock or switch to be closed. By employing a simple code generating or sensing means for the code in a finger ring, the user or subscriber to the system need not go through the time consuming procedures of manipulating (after finding) a key to open a lock or close a switch; the only operation being the placement of the hand wearing the ring adjacent to or in alignment with a reading device or receiver for the ring code.

Accordingly it is a primary object of this invention to provide a new and improved system and method for opening a door lock and/or a door.

Another object is to provide a system for easily closing a switch to control the operation or starting of a machine, such as a motor vehicle, wherein persons not authorized to effect such switch operation may not do so.

Another object is to provide a control system for a machine or for opening a door or lock which is not burdensome and which enables such control by a simple movement of the hand to a predetermined location or in the vicinity thereof.

Another object is to provide a simple lock opening means which does not require a key or the complex operation of pushbutton switches.

Another object is to provide a new and improved personal detection system employing coded finger rings worn by users of the system to effect such detection and, in certain instances, auxilliary electronic means to complete or effect detection of subscribers to the system to reduce the possibility of fraud in operation of the system.

Another object is to provide a security system for buildings which employs simple means for opening doors and locks, which means is foolproof in operation and is inexpensive to produce.

Another object is to provide improvements in door locks and means opening same without the use of keys.

Another object is to provide a door lock or the like which may be opened both by electronically controlled means without a key and also by means of a key.

Another object is to provide an electronic control system for opening a door or lock in response to the detection of variations in an energy field caused by circuit means associated with a finger ring and/or a card carried by the person wearing the ring.

Another object is provide improvements in the structures of coded or signal generating finger rings for use in security and lock opening systems.

Another object is to provide a security system employing a radiation field or series of such fields and a plurality of detection means for means varying such field or fields.

Another object is to provide an antitheft system employing electronic detection means for a coded devices carried by a person.

With the above and such other objects in view as may hereinafter more fully appear, the invention consists of the novel constructions, combinations and arrangements of parts as will be more fully described and illustrated in the accompanying drawings but it is to be understood that variations, changes and modifications may be resorted to which fall within the scope of the invention as claimed.

BRIEF DESCRIPTION OF THE DRAWINGS

FIG. 11 shows a modified form of the ring of FIG. 10 in cross section.

FIGS. 12 and 13 show yet another modified form of ring in cross section.

FIGS. 13-15 illustrate another inventive arrangement.

Figures 1, 2A, 2B, 3:
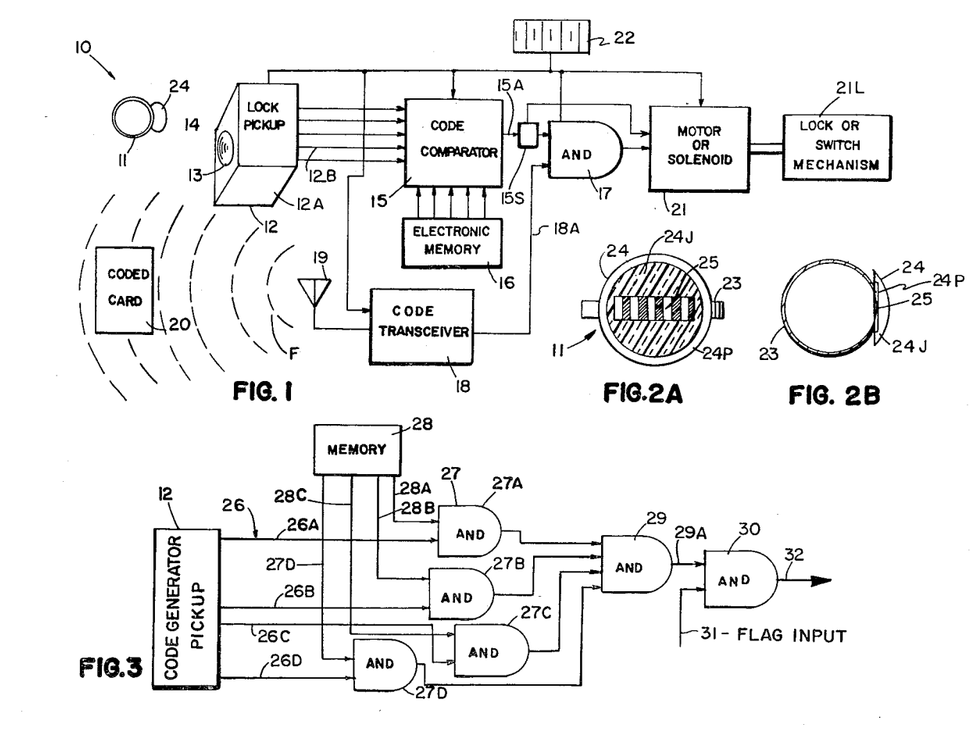
FIG. 1 is a schematic diagram of the broad components of an electronic system for enabling or effecting the opening of a lock or door or the closure of a switch.
FIG. 2A is a plan view with a portion removed of a finger ring containing reflective or otherwise provided code elements within or behing the crown of the ring.
FIG. 2B is a side view of the ring of FIG. 2A.
FIG. 3 is a schematic diagram of an electronic code comparator employable in the system of FIG. 1 and other systems of the invention.

In FIG. 1 is shown an electronic system 10 which may be employed, in the particular embodiment illustrated, to open an electrically operated lock and/or to activate another device or control switch when a finger held ring is brought into the vicinity of a sensor or pick up means. The sensor or pick up may be built into or disposed adjacent a lock for a door, safe, machine or other device which is operable to sense certain coded characteristics such as optical code marks or other means associated with the crown or base of the ring as illustrated, for example, in FIGS. 2A and 2B. The crown 24 of ring 11 may be manually disposed or pushed into a cavity or recess 14 formed in a receptacle 13 which is part of or assembled to a housing 12A forming part of the lock pickup assembly 12 which may comprise part of a modified electro-mechanical door lock or may be disposed adjacent thereto in the vicinity of the lock.

Electronic circuits located within housing 12A of the lock pickup 12 are responsive to the signal outputs of one or more sensors disposed adjacent to the receptacle 13 and generate a parallel code on parallel outputs 12B of the pickup which outputs extend to an electronic code comparator 15. The comparator 15 compares the parallel code with one or more authorized codes presented to it from a memory 16. If the code presented to comparator 15 on the outputs 12B does not match the code presented to it from the memory 16, the lock will not be activated or opened. If the code so presented matches the code or codes in the comparator memory 16, a signal is generated on an output 15A of comparator 15 which is either applied directly or indirectly to a motor or solenoid 21 operating the lock 21L to open. In FIG. 1, a logical AND circuit 17 is not only connected to the output circuit 15A of code comparator 15 but also has, as a second input, a circuit 18A extending from a code transceiving circuit 18. The circuit 18 receives energizing input from an antenna 19 generating an activating signal on output 18A in response to the presence of a properly coded card 20 in the range of the field radiated from antenna 19. In other words, the transceiver 18 includes suitable oscillator means for generating an energy field F in the vicinity of the antenna 19, which energy field is altered or modified by means of the coded card 20, which contains suitable electronic circuits for effecting such modification and such modification is detected by variations in the energy received by antenna 19 and transmitted to code transceiver 18. Thus, if the card 20, for example, is carried by a person on whose finger the ring 11 is also supported, the presence of the ring 11 at the receptacle 13 and the card 20 in the pocket or otherwise held by the same person would be required in order to energize the lock activating motor or solenoid control 21 to operate the lock servo controlling the operation of the lock 21L.

In FIG. 1, a switch 15S is shown in the output 15A of the code comparator 15 for connecting said output 15A to either the input of the AND logical circuit 17 or the input to the lock activating control 21. The switch 15S may be set by hand, by remote control means or other means, or may be eliminated wherein the output 15A of code comparator 15 is connected either directly to the control means 21 or the AND circuit 17. In the former case, the presence of ring 11 at the receptacle 13 will be sufficient to cause the lock 21L to be automatically opened. In the latter case, the presence of ring 11 and the coded card or device 20 in their respective scanning fields will be required to effect opening of the lock 21L.

It is noted that all of the devices illustrated in FIG. 1, with the exception of the ring 11 and the code generating device 20, may be supported within a single housing which may be disposed adjacent to or comprise part of the lock housing. Notation 22 refers to a suitable source of electrical energy such as a battery or line current, a combination of the two or other means for supplying electrical energy for powering the electronic devices associated with the various components illustrated and described.

In FIGS. 2A and 2B is shown one form of a coded finger ring which employs optically coded means. The ring 11 is formed with a circular ring portion 23 which is intended to fit and hold the assembly around the finger of the hand, and a crown portion 24 is attached to the ring portion 23. Coded elements 25 are formed on or disposed within the crown portion 24 and may contain printed, cast, assembled or otherwise formed dark and light portions or bands of color, arrays of light emitting diodes, liquid crystal display elements or other optical means arranged therein to form a unique code which is recognizable by the lock system 10 when scanned, for example, by a scanning means located within the lock pickup housing 12A. The code bearing elements 25 may be covered and protected by a transparent jewel or window 24J employed for ornamental purposes and to hide and protect the coded elements 25. The coded elements 25 may also comprise reflex reflecting material or corner-reflecting material formed, for example, by molding the rear surface of the jewel 24J or the front surface of the mounting plate 24P. By providing such a reflex reflecting material or surface and disposing a thin coded strip or bar-printed material between the reflector or reflecting surface and the jewel 24J, scanning light generated, for example, by a light source located within the lock pickup housing 12A may be passed through the jewel and reflected back to the lock pickup after being modulated by the variations in color or density provided by the printed strip disposed within or against the back of the jewel in front of the reflecting surface of the ring and may be utilized to provide a variable electrical signal or signals in the form of a code on the output or outputs of one or more photoelectric detectors located within or adjacent receptacle 13 to provide the code described on the outputs 12B of the pickup.

In FIG. 3 is shown a code comparator and memory which may be utilized to define the elements 15 and 16 of the system 10 of FIG. 1. Input lines 26 extend to a series of logical AND switching elements 27 denoted 27A-27D, on which inputs 26 is generated an unidentified code, for example, by means of a plurality of photoelectric detectors receiving reflected light from the coded portion of the ring 11. The other inputs to the AND circuits 27A-27D are from a memory 28 which may vary from a full dynamic memory containing a number of authorized codes or may be merely selected wires connected to supply appropriate polarities to form the code presented to the AND elements 27A-27D. When the code presented on the outputs 28A-28D of the memory 28 are matched by the codes presented on the circuits 26A-26D connected to the inputs 26, the AND circuits 27A-27D will each generate an output and when the four outputs thereof are present on the inputs to a second AND circuit 29, its output 29A will become activated with a signal. The latter output extends to one input of a logical AND circuit 30 having another input 31 activated when, for example, the presence of the ring 11 and/or the card 20 is detected. When the AND circuit 30 has both its inputs activated, a signal is generated on its output 32 which is employed to operate the lock servo or a control for operating same so as to effect, for example, the opening of the lock.

Figures 4, 5:
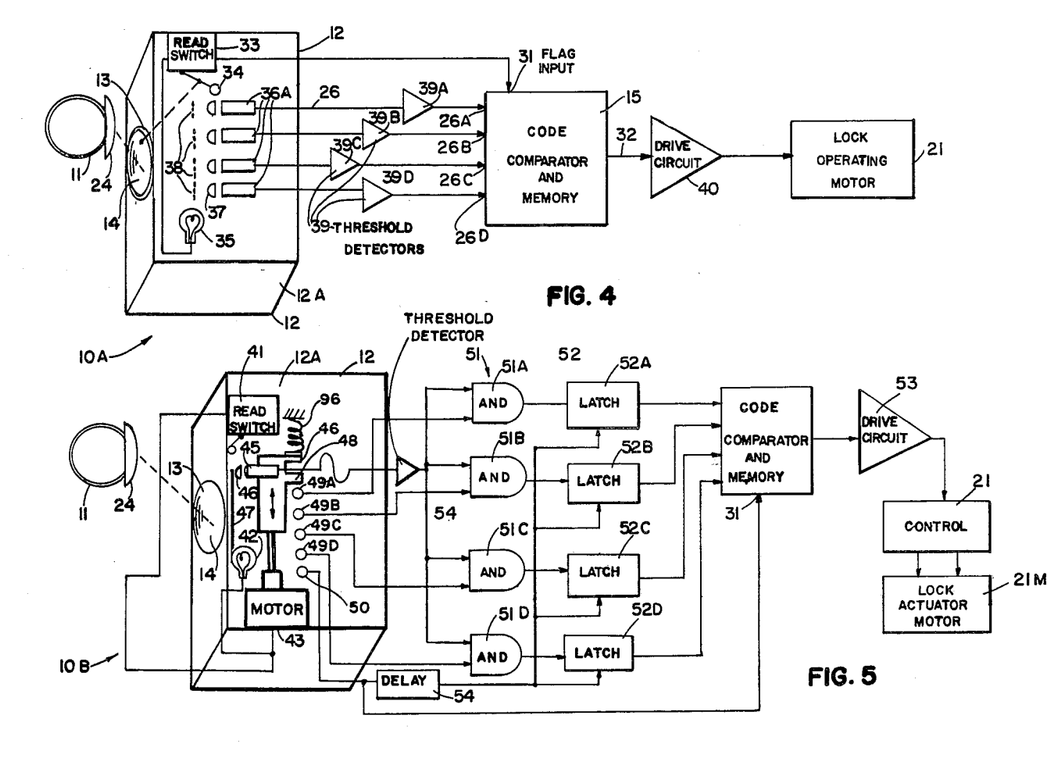
FIG. 4 is a schematic diagram of an electronic system for reading optically recorded codes of finger rings, by means of a bank of photoelectric cells.
FIG. 5 is a schematic diagram of a modified electronic system for photoelectrically reading codes of rings wherein photoelectric detection means of made to more while scanning the ring code.

In FIG. 4 is shown a modified form of the system 10 of FIG. 1 denoted 10A and employing static optical means for sensing the coded information presented to the receptacle 13 when the crown of the ring 11 is disposed within the cavity of the receptacle 13. A normally open limit switch 33 contains a switch activating lever or actuator 34 which closes the switch when the ring crown is disposed within the cavity 14. Closure of switch 33 supplies current for activating a light source 35, such as an incandescent lamp disposed within or adjacent the receptacle 13 and the flag or energizing input 31 to a code comparator 15 of the type described. Light from source 35 is directed through the jewel or crown of ring 11 illuminating the coded elements 25 thereof and the reflected light is directed to a plurality of photoelectric cells 36 such as phototransistors, photodiodes or the like, through respective optical lenses 37. The photoelectric cells 36 respond to the coded light which is reflected from the code defining means located within the ring 11 and generate a parallel code on their outputs which may be representative of black and white bars or color variations within the ring. If different colors are employed to form the code within the ring, color filters 38 may be employed to make the photosensors 36 responsive only to the wave length of light passed by its respective filter. In either case, threshhold detectors 39 such as Schmidt trigger circuits, operational amplifiers or other means denoted 39A-39D eliminate ambiguities in the outputs of the photosensors and buffers such outputs. The code comparator circuit 15, which was previously described, admits the code from the threshhold detectors 39 on input lines 26 and, if the code so detected is in accordance with the code presented by the memory connected to or disposed within the comparator 15, the output 32 of the comparator becomes activated with a signal which is passed to a drive circuit 40 which buffers the comparator output 15 for subsequent application to operate a servo device 21, such as a solenoid or motor, to operate the lock.

FIG. 5 illustrates a first construction in a scanning type of key ring code reader in a system 10B employing a moving photoelectric scanning means. The ring 11 is shown about to be inserted into the cavity 14 of a receptacle 13 of the type described and, when so manually moved and positioned, activates a read limit switch 41 which initiates system operation by supplying power to an illumination means 42, such as an electric lamp or light emiting diode. The lamp 42 illuminates the coded surface or code bearing elements 25 of the ring 11. When the read switch 41 is closed, it also activates a solenoid or motor 43 which drives a mounting plate 44 for a photosensor, such as a photodiode, phototransistor, or photoelectric cell 45 which is supported thereby together with a lens 46 and, if the code is defined by variations in color, color filters 47. A position locating index 48 is also supported by mounting plate 44. The plate 44 is moved toward and against the resistance of a return mechanism including a spring 96. This movement shifts the photosensor 45 in a scanning path to scan the variations in light caused by the coded array or strip 25 of the ring causing the photosensor to sense the relative reflected light contrast of each bar or spot of the coded array thereof which is printed or otherwise provided within the ring crown housing. The signal from photosensor 45 is input to a threshhold detector 54 which is connected to one input of respective of a parallel array of logical AND circuits 51, which are denoted 51A-51D. A projection or pin defining a location index 48 forms part of the plate 44 and moves therewith to sequentially and momentarily close a plurality of normally open switch contacts denoted 49A, 49B, 49C and 50, each of which pairs of contacts, when closed, indicates the component of the code of the coded strip 25 within the housing of the ring 11 which the photosensor 45 is reading at such time.

Switches 49A, 49B, 49C &49D are connected to energize the other inputs to a plurality of logical AND circuits denoted 51A-51D, in sequence as the photosensor 45 scans the code or coded strip 25. Whenever both inputs of each of the AND circuits 51 are simultaneously activated, the output of that AND circuit activates the set input of a corresponding latch circuit 52, with each of the latch circuits denoted 52A-52D in FIG. 5. The latch circuits 52, in turn, activate a corresponding input 21 to a code comparator and memory 15 which is constructed as described in FIG. 3. When the location index 48 actuates the switch 50 near the end of the throw or travel of the mounting plate 44, the closure of said latter switch gates electrical energy to the flag input 31 of code comparator 15 causing the comparator to electrically compare the codes presented to the input lines 26 thereof with the authorized code or codes defined by the memory provided in or connected to the comparator and, if the code so presented to the comparator matches the code or codes of the memory associated therewith, an activation signal is generated in the output of the comparator and passed to a driver circuit 53. The driver circuit 53, in turn, activates lock motor control circuit 21 which operates the lock motor or solenoid, as described, to effect the automatic opening of the lock.

When location index switch 50 is closed, it activates a delay circuit 54, which may be a monostable multivibrator. The delay circuit 54, after a predetermined period of time, which is long enough for circuit operation and for the operator to pass through the locked door, activates the reset lines to all of the latches 52 thereby clearing them for their next use and resetting or relocking the lock circuit 21.

Figure 6:
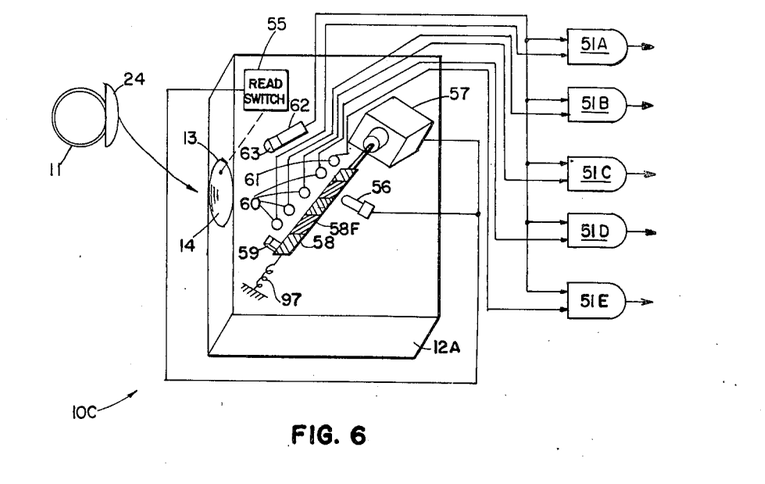
FIG. 6 is a schematic diagram of a photoelectric means for reading ring supported codes which are defined by variations in color.

In FIG. 6 is shown an alternative optical scanning system 10C associated with the lock opening circuit of the type described whereby a photosensor 62, fixed with an associated lens 63, and a strip 58 of different wave length transmission filters 58F is supported within housing 12A for movement by means of a solenoid or motor 57 and, is shifted in front of a light source 56, thereby changing the color of the illumination source.

When key ring 11 is inserted into the cavity 14 of a receptacle 13 of the type described, which is attached to the lock pickup housing 12A, it depresses the actuator arm of a read limit switch 55 causing it to close to supply electrical energy to a light source 56 and it also activates a solenoid or motor 57 which is operable to drive a color filter bar 58 containing a location index tab 59 past the light source 56 against the pull of the return spring 97. As the location index 59 passes over the bank of sensing switches 60 and switch 61, which may comprise an array of photodetectors or spring biased contact pairs, it activates each one sequentially so as to provide a position indication on each output line thereof at a time. Output lines extending from photosensor 62 and from location sensing switches or sensors 60 and the line from the end-of-scan location sensing switch or photosensor 61 are connected to the corresponding inputs to the logical AND switching circuits denoted 51A to 51E. The system defined in FIG. 6 contains additional switching and control elements, as set forth in FIG. 5, and the remaining operation thereof is similar to that of the apparatus of FIG. 5.

Figure 7:
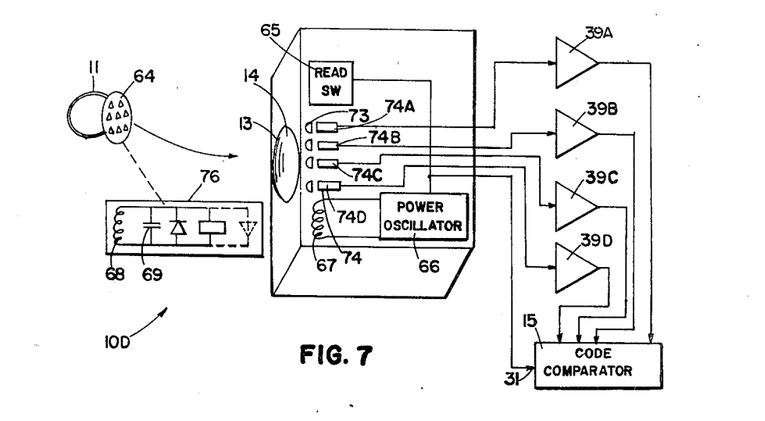
FIG. 7 is a schematic diagram of a ring code reading system wherein the ring contains light emitting means to define code.

FIG. 7 illustrates another arrangement for a key ring system 10D employing optically readable means in the form of coded elements which are light emitting diodes, liquid crystal displays or similar devices which, by means of their physical arrangement, comprise the code to be read. Key ring 11 contains active light emitting or light control elements 64 such as light emitting diodes or liquid crystal display elements mounted within or behind the crown of the ring which, when it is inserted into the cavity 14 of the receptacle 13 of the lock pickup 12, activates a limit switch 65 of the type described which, upon being closed by means of the ring actuation thereof, supplies power for an oscillator circuit 66 and the read flag for the code comparator 15 so as to initiate operation of the system. Coupling coil 67 which is connected to the power oscillator circuit 66 radiates an energy field when powered by oscillator 66 which field is partially absorbed by a pickup coil 68 which is located within the housing defined by the crown of ring 11. Pickup coil 68 may be tuned in conjunction with a capacitance 69 so as to generate an alternating current flow in the circuits connected thereto which include a plurality of light emitting devices such as light emitting diodes denoted 70 and 71. A bank of photosensors 74A to 74D located within or behind the receptacle 13 and optically coupled thereto through small windows in the receptacle or a transparent portion of the receptacle wall, sense the spots of illumination generated by the light emitting diodes 64 supported within or behind the crown of the ring. Such pattern of light may be passed through optional lenses 73 supported within or behind the receptacle 13 so as to energize the outputs of the photosensors in a parallel code array. Such outputs may be connected to the parallel inputs of a comparator 15 as described and compared therein with a parallel code generated by a memory forming part of or connected to the comparator. The remaining circuitry for operating the lock servo or servos or other devices described, is similar to the circuitry and devices previously described.

Figure 8:
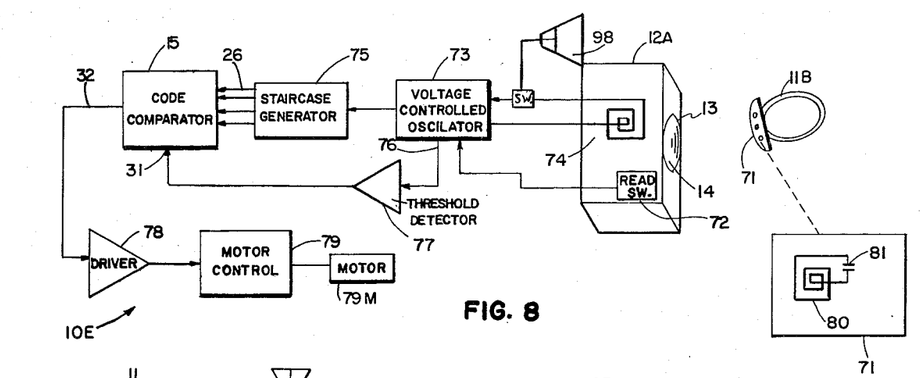
FIG. 8 is a schematic diagram of a security system employing codes which are generated electronically within finger rings used in the system.

In FIG. 8 is shown a non-optical system 10E for the reading of a coded key ring for the purpose of opening a lock or closing a switch as described, wherein electromagnetic coupling means is provided. Key ring 11B contains one or more circuits 71 of the microminiature type which may comprise a plurality of microtransistors and connecting circuits disposed on a substrate and operable to generate a code when the circuits are energized. Insertion of the crown of the ring into the cavity 14 of the receptacle 13 activates a read switch 72 which connects a source of electrical energy to the control means which includes a voltage controlled oscillator 73 containing a loop antenna for radiating the energy of the oscillator in the vicinity of the lock pickup housing 12A.

When a tuned circuit, such as a portable device of the type described, enters the field generated by the oscillator, such circuit absorbs some of the oscillator's energy and thereby loads the oscillator and causes certain electrical parameters to change in the oscillator's active components. In this case the oscillator is voltage controlled and the current parameter changes are experienced on the output 76 thereof. The tuned circuit is contained in ring 11B as part of the circuit or circuits 71 and consists of an inductance 80 which is provided in parallel with a capacitance 81 and may be one of a number of similar circuits tuned to different specific frequencies forming a specific code.

Voltage controlled oscillator 73 is tuned by the progressively increasing voltage available from a staircase generator 75 which also has a coded output corresponding to the voltage "step" on the staircase generator's waveform, which corresponds to the specific frequency of the voltage controlled oscillator, which output is subsequently applied to a comparator 15 of the type described, through a plurality of inputs 26 thereto.

Current sensing output 76 is connected to a threshhold detector 77 and when the voltage controlled oscillator 73 senses the properly tuned circuit 71, it triggers the threshhold detector 77 which activates the input flag 31 of the code comparator 15. If the code so generated is matched within the comparator 15, the output 32 thereof is energized and activates the driver circuit 78 which activates control 79 for the motor or solenoid of the lock or any other suitable device denoted 79M. It is noted that the circuit illustrated in FIG. 8 may also be activated from a remote location for the purpose of remotely controlling a machine element or a door operating mechanism for opening and/or closing the door. In this arrangement, all the lock pickup circuits are eliminated. In their place is provided a directional antenna 98, such as a horn antenna. If ring 11 is brought into the operating range or field of the horn antenna, it may be employed to activate a comparator means of the type described or utilized to provide the described remote controlled operation of a motor for opening or closing a door.

Figure 9:
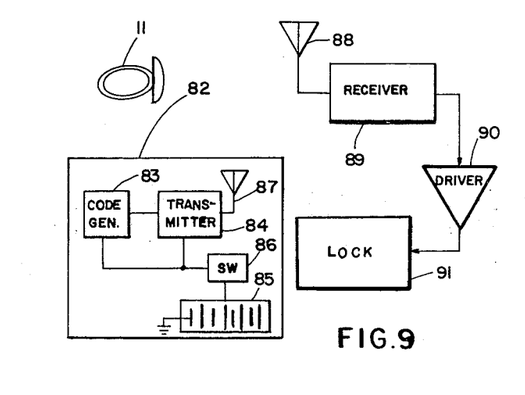
FIG. 9 is a schematic diagram of an electronic system employing a finger ring containing a battery operated code genation circuit or circuits.

In FIG. 9 is shown an arrangement whereby an active circuit may be employed to operate a controlled device such as a lock or a motor operating a garage door. A key ring 11 of the type described contains a circuit 82 activated by the wearer when a switch 86 is manually closed. A battery 85, preferably located in the crown portion of the ring 11, supplies power through a switch 86 to a code generator 83 and a transmitter 84. Code generator 83 provides a uniquely coded short wave signal which is radiated on an antenna 87 connected to the transmitter 84. The signal is picked up by a receiving antenna 88 and made available to a receiver 89 connected thereto. When the signal is received by receiver 89, it is detected and transmitted to a driver circuit 90, which, when so activated, operates a control 91 for motor or solenoid for opening or closing a door, or a switch for operating a machine.

Figure 10:
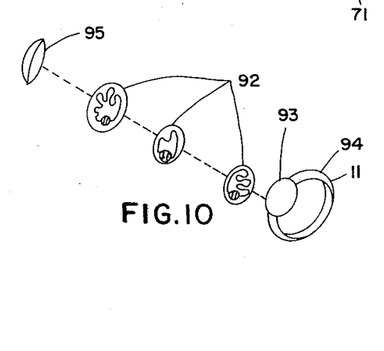
FIG. 10 is a side view of a finger ring with parts sectioned for clarity, used in one or more embodiments of the invention.

In FIG. 10 is shown means for constructing a multiplicity of electronically tuned elements in a small space such as within the housing of a lock or a sensor housing as described. Electronic circuits 92 are formed of thin circuit board material, such as thin sheet plastic, with an inductance created by folding the plastic sheet back and forth against itself. The capacitance may be added with a fixed or trimmer capacitor or may be created by closely spacing the circuit patterns. Several such "discs" may be layered, one on top of another, and placed on a non-metallic back support 93 which is mounted on the support 94 for the crown for a ring 11, a button or other means which is covered by a decorative jewel providing both an aesthetically pleasing and compact assembly which contains a multiplicity of tuned or coded circuits.

Figure 11:
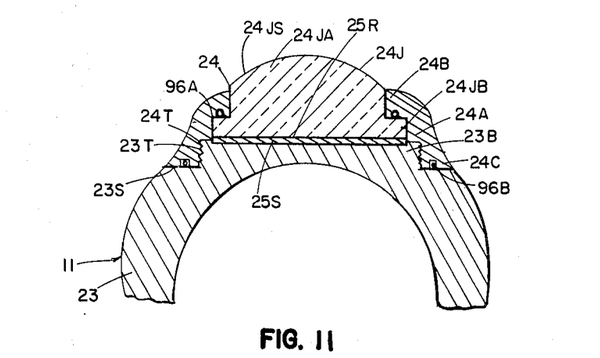
FIG. 11 is a side view in cross section of a portion of of a finger ring containing a portion of one form of the invention.

In FIG. 11 is shown details of the optically coded finger ring employed in the systems illustrated in FIGS. 1 to 7. The ring 11 is formed with a metal or plastic ring portion 23 adapted to circumscribe and be held around a finger of the hand. Crown portion 24 is of greater thickness than ring portion 23 and is formed of an assembly of the frontal portion or base 23B of the ring portion, the transparent jewel 24J and an annular crown ring or collar 24A. The collar 24A has a stepped internal surface as shown to permit it to threadably assemble with the threaded base of the ring and to compressively engage the jewel and effect a sealed assembly therewith. Jewel 24J has an upper portion 24JA with a concave outer surface 24JS which is preferably smooth and polished with a lens-like configuration although such surface may be flat to define a window through which scanning light may be passed in both directions. The back end of the jewel 24J is defined by a stepped shelf 24JB and the rear surface thereof is flat to permit it to compressively engage with or have flatly bonded thereto a disc shaped sheet 25S containing colored indicia or reflective material 25R defining the described reflecting code bars or spots which may also be in the form of concentric circular bars of opaque and reflecting material, colored inks and/or a mask disposed across a reflex reflecting material bonded to or defining the sheet 25S. Various other code defining indicia in different configurations may also be employed for the sheet 25S or material disposed thereon.

The shelf 24JB is engaged by a circular lip portion 24B of the collar 24A which, when the internal threads 24T of the lower portion of the inside surface of the collar engage and are tightened against the external threads formed in the side wall of the base 23B of the ring 23, compressively secures the jewel against the code bearing sheet 25S wherein the latter is compressed against the flat outer face of the base 23B of the ring.

The underside of the lip portion 24B which engages the outer surface of the shelf 24JB of the jewel 24J is provided with a sealing washer 96A which may comprise an O-ring seal seated in a groove or channel formed in said lip portions lower surface and is operable to effect a fluid pressure or hermetic seal between the collar's lip portion and the jewel's shelf portion. A second sealing ring or O-ring 96B is disposed between the lower face of the collar 24A and an annular surface 23S of the ring 23 which extends beyond the threaded portion 24T of the base. Thus if it is desired to change the coded disc 25S or a mask associated therewith, collar 24A may be unscrewed permitting the jewel 24J to be removed from engagement with the disc and the disc to be replaced with another.

In FIG. 11, the disc 25S may also comprise a printed circuit or microminiature integrated circuit chip, as described, for generating a code in response to the energy of a radiation field into which the ring is brought, or for altering a radiation field in a coded manner such that detection thereof may be made as described by a receiver in the vicinity of the radiation or short wave generating field generator.

Figure 12:
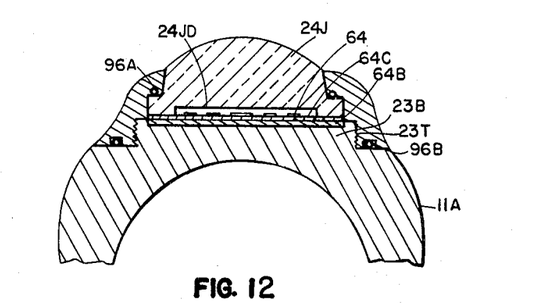
FIG. 12 is a side view in cross section of a portion of a finger ring containing microminiature electronic circuits defining another embodiment of the invention.

FIG. 12 shows a coded ring structure somewhat similar to that provided in FIG. 11 with the exception that the electrooptically scannable disc has been replaced by a microminiature electronic chip or printed circuit disc 64B containing circuit elements or light emitting diodes 64, as described, and suitable current generating means 64C for powering said diodes when in a suitable radiation field for energizing said generating means. The rear face of the jewel 24J has a recess 24JD formed therein to accomodate the chip or support 64B for the circuit elements and/or light emitting diodes.

Figure 13:
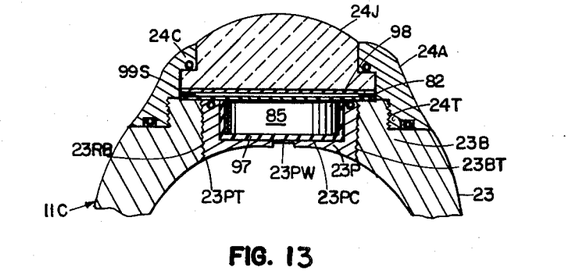
FIG. 13 is a side view in cross section of a modified form of the finger ring of FIGS. 11 and 12.

In FIG. 13 is shown details of a code signal generating ring 11C of the type provided in FIG. 9 containing a small disc shaped battery 85 for powering a code generating circuit supported on a disc shaped substrate 82C held within the ring. The circuit 82, which is shown in FIG. 9, is supported on either or both surfaces of the disc or chip 82 which also contains interconnecting circuit elements or leads engaging the terminals of the battery 85 which seats in a recess 23PC formed in a plug recepticle 23P which is cylindrically shaped and externally threaded at 23PT to engage the threads 23BT of the base 23B of the ring bore 23RB. A collar 24A is employed as described to retain a jewel 24J, similar to the jewel of FIG. 11, in compressive and sealing assembly against a partially compressed flexible washer 99 which is made of a conductive elastomer. The ring or washer 99 bridges two closely spaced flat strip circuit elements (not shown) formed on the upper surface of the substrate 82C and provides a conducting path thereacross when the crown jewel 24J is pressed, as by applying finger pressure thereto, toward the center of the ring and the circuit elements are so provided that, when such conducting path is established, the battery 85, which is compressively connected to the lead circuits of the board, will be connected to energize such circuits as described to cause a short wave code signal to be generated. It is noted that the jewel 24J of FIG. 13 may be so compressed to complete the circuit between the battery and the signal generating means described when it is disposed within the cavity of the lock or switch recepticles described. Notation 23PW refers to a shaped cavity formed in the outer surface of plug 23P into which the end of a wrench such as an Allen wrench, may be inserted for tightening or loosening the plug for battery replacement and removal. Notation 97 refers to a cup shaped sleeve of insulating plastic surrounding the battery when it is disposed in recess 23PC. The ring structure shown in FIG. 13 may also be employed to power light emitting diodes to generate the desired ligh code to be read by photoelectric cells as described when the ring crown is disposed in a cavity of a lock or switch recepticle.

Figure 14:
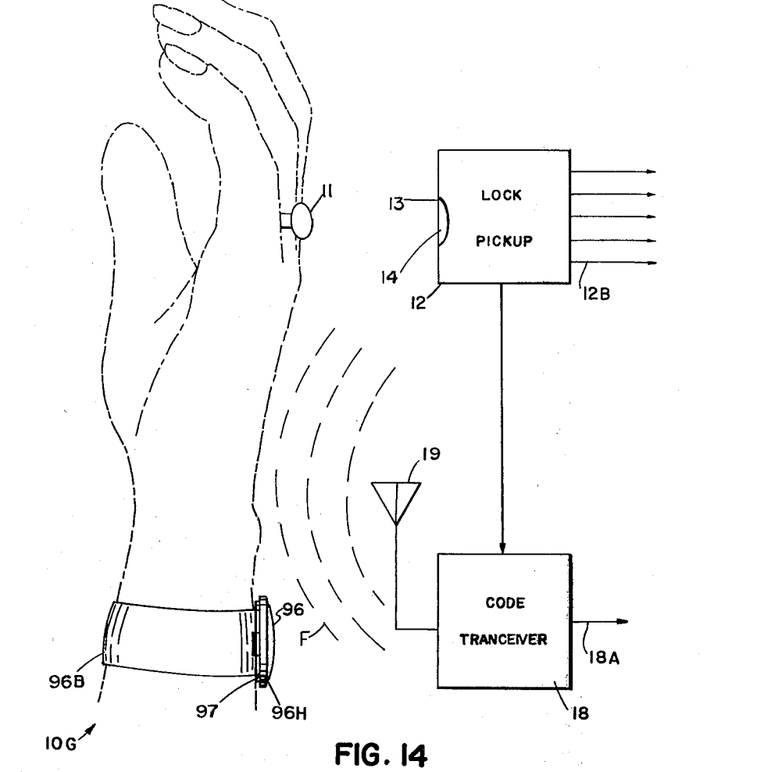
FIG. 14 is a schematic diagram of a lock pickup and a wrist supported means for modifying a signal generated adjacent the lock pickup to permit detection and operation of the lock.

In FIG. 14 is shown one form of the invention, which is a modified form of the system illustrated in FIG. 1 wherein the coded card 20 thereof is replaced by a thin disc electronic circuit which is attached to a convenient device worn by the person whose coded finger ring is employed to activate a lock servo motor or solenoid or to close or open a switch as described. The coded finger ring 11 is shown supported by a finer of the hand of the subscriber or operator. A digital electronic wristwatch 96 is shown secured to the wrist of the hand holding the finger ring, by means of a watch band 96B. Secured to and disposed in abutment with the flat rear face of the housing 96H of the wristwatch 96 is a disc-shaped chip or card 97 containing a suitable electronic circuit which is tuned and operable, as described, to affect an energy field F generated by a code receiver which is activated when the crown of the finger ring 11 is disposed within the cavity 14 of the receptacle 13 of the pick-up which is located within the lock housing 12. The remaining circuits which form part of the system 10G of FIG. 14 are similar to those previously illustrated and described in FIGS. 1–3 wherein the parallel outputs 12B of the lock pick-up generate a parallel code as a result of reading the code associated with the ring 11, which parallel code is passed to a code comparator, which is employed together with the enabling signal generated on the output 18A of code transceiver 18 when it properly detects the variation in the energy field F or the code generated by the circuits of card 97 in response to the energy field generated on the output of the antenna 19. In other words, in order to enable the door lock to be opened or to open same or operate a motor for opening a door or other device, both the code read when the crown of the ring 11 is scanned as it is inserted into the cavity of the receptacle 13, and the code generated by the flat circuit 97, define whether the lock, door or other motor may be properly operated.

Figure 15:
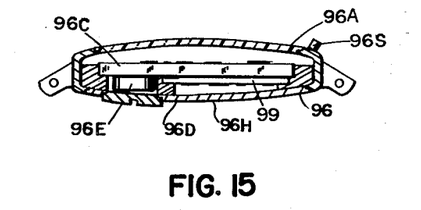
FIG. 15 is a side view with parts broken away and sectioned of the wrist mounted device of FIG. 14.

In FIG. 15 is shown greater details of the watch 96 of FIG. 14 wherein said watch 96 includes a housing 96H with a side and rear wall portion 96H and a lensor transparent cover 96A defining the major portion of the front wall of the housing as shown in the cross-sectional view. Supported within the housing 96H is an electronic circuit formed on a chip 96C, which circuit includes time keeping and driving logical elements provided, either thereon or on separate chips supported by the circuit 96C.

Supported adjacent the rear face of the circuit board 96C is a chip, disc or card 99 containing a microminiature electronic circuit of the type which will either generate an output short wave signal in response to the energy from field F or will be tuned to the code transceiver 18 and so affect the energy field F as to be easily recognizable by the code transceiver which generates a recognition signal on the output 18A thereof when the watch housing 96 and the circuit chip 99 is within a suitable range of the antenna 19 of the code transceiver 18.

Thus it is noted that when the ring 11 is properly disposed within the cavity 14 of receptacle 13 and the watch housing 96 is located near the antenna 19, the effect is such that the two signals generated on the output of a lock pick-up and housing 12 in the code transceiver 18 may be employed to activate a switch or relay for control purposes such as described above.

Whereas in FIG. 14 the coded electronic card or chip 97 is operable to activate the code transceiver 18 in the manner described in FIG. 1, in FIG. 15 the watch housing 96 contains a similar electronic circuit containing chip or card 99 disposed therein, as illustrated, against the rear face of the electronic circuit board 96C containing the time generating and display circuits for the watch. The assembly 96 of FIG. 15 includes in addition to the watch housing 96H, a push button 96S for operating the switch which may be utilized to activate the time display circuits and the display elements of the electronic components supported by the watch circuit board 96C and, if the circuits of the circuit board or chip 99 which are employed to activate the code transceiver 18 are battery operated by means of a battery 96E supported within the housing, the switch 96S or an auxiliary switch may also be employed to complete a circuit between said battery and the circuit or circuits supported by board or chip 99. In such a latter embodiment, the code generating circuits supported by chip 99 may be operable to generate such code and transmit it via short wave radio to the code transceiver 18 and employed with or without the lock pick-up in housing 12 to open a lock or door or operate another device when the push-button 96S or an auxiliary switch supported by or within the housing 96H is manually or otherwise operated by the person wearing the watch. The battery 96E may be employed to power operate both the circuit supported by the circuit board or chip 96C and chip 99. Notation 96A refers to a transparent cover or crystal for the face of the watch.

In modified forms of the devices and systems illustrated in FIGS. 14 and 15, it is noted that the code generating circuits supported by the chip or board 99 of FIG. 15 may also be formed directly on the main watch chip or circuit board 96C and powered by the battery 96E at all times or when manually operated switch is closed. Such circuit may also be a passive circuit operable in the manner described to be energized by the energy field F when in the vicinity of the antenna 19 and to generate and transmit a code as described or to alter the energy field in the vicinity of the antenna 19 as described for activating code transceiver 18.

In still another embodiment of the wrist mounted assembly 96 of FIG. 15 or the ring 11, it is noted that a microphone or other sound responsive transducer may be supported or within the housing 96H and may be operable to convert sound, such as a word spoken by the person wearing the watch, to electrical analog audio signals which may be broadcast per se by a short wave transmitter formed of microminiature circuit elements supported by either or both the circuit boards 96C and 99 or may be digitized and broadcast as digital code signals to be received by the code transceiver 18 and employed thereby for identification and/or lock or door opening purposes as described herein. The analog or digital signals derived from a particular spoken word or words may be analyzed in the code transceiver 18 by digitizing and comparator means before the results of such analysis are employed to activate a switch or lock so that only ahtoirized persons or subscribers to the system may effect such lock or door activation or identification.

It is noted that the systems and devices heretofore described and illustrated in the drawings may be employed for security purposes and to serve functions other than to effect the opening of a door lock, gate movement or the like. Such other functions are noted as follows:

1. The combination of a coded or electronic ring and electronic card or the use of either per se may be employed to initiate the operation of a machine, such as an electric motor or solenoid operated or controlled production machine which would not ordinarily be operable by the local closure of a manually operated switch. Such machines as metal working machinery, printing machines such as copiers, record playing machines for playing back recorded messages, product or material dispensing machines, etc., may be cyclically or continuously operated when, for example, a finger ring is brought into the vicinity of or inserted into a receptacle and/or when an electronic circuit containing card or other device containing such a circuit is carried to the vicinity of a source of radiation and a detector of variations in such radiation as effected by means of the described card.

2. Either or both the described coded or electronic ring and card may be employed to effect the closure of a switch or a series of switches for effecting or controlling the operation of one or more machines, such as a vehicle, when the ring is inserted into the described receptacle and/or the circuit card described is brought into the vicinity of a detector therefor of the type described. Such arrangement may be combined with the operation of one or more additional controls or switches by the person carrying the ring and/or card to effect the operation and control of a vehicle, for example, by connecting a battery with the starting motor or driving motor of the vehicle or enabling such connection by the manually effected closure of a further switch such as an ignition switch therefor.

3. Failsafe and detection means may be provided in any of the systems denoted 10-10E which have been described, to either sound an alarm to remotely indicate or effect the recording of an event, such as the insertion of the crown of a finger ring into the described receptacle without the presence of a second device such as the circuit card 20 of FIG. 1. In other words, the failure to provide the secondary card 20 of FIG. 1 in the vicinity of the lock or scanner for the finger ring, when detected by a suitable logical switching and control arrangement triggered, for example, when the described read switch is actuated by insertion of the finger ring into the receptacle cavity 14 without detection of a suitable code generating card in the radiation field, may be utilized to operate a remote or local alarm, and/or operate a photographic or television camera to scan and perhaps record events in the vicinity of the door or other device being tampered with.

4. In addition to the stationary and moving scanning means for the finger ring code described above, it is noted that relative movement may be effected between the described crown of the finger ring and one or more transducers which are operable to read the code of the ring, by merely moving the hand containing the ring in a pivoting movement about the wrist to cause the crown of the ring to describe a circular moving path defined by its sliding engagement with the concave surface of the wall of the cavity 14. Such sliding rotational movement may be such as to effect the scanning of the coded strip or elements 25 of the ring by a stationary photosensor or a number of such photosensors, to generate a parallel or series code on their outputs which code may be automatically compared by means of a comparator, as described, and utilized to effect one or more of the switch operating or motor controlling operations described above.

5. The active or passive circuits of the finger ring and the radiation field generating and detection circuits described above may be employed to operate a solenoid or motor for opening and or closing a valve such as a valve in a line leading to a dispensing faucet or nozzle to effect the dispensing of a liquid therefrom when the ring or a card is in the vicinity of the faucet, nozzle or valve and the electronic circuit controlling same. The filed generating and detection circuits described and located in housing 12A of the drawings may be provided either in the faucet hardware or supported by the sink, basin or chemical container for the liquid. IN such a system, the field generating and detection circuits described are preferably powered by a step down transformer generated current available at 12-28 volts to avoid electrocution or shock in the event of a short circuit.

6. Logic circuit means may be provided in the described circuits for energizing an alarm and/or operating a camera such as a photographic camera or television camera to take a picture of the person presenting a finger ring and/or coded card to the detection and lock or door activating means when such ring or card does not contain an enabling code or each time such a card and/or ring is so presented thereto.

7. The described rings and or coded cards may be employed in an identification and lock opening or door opening system wherein a voice identification means is provided to enable the described automatic functions to occur when the ring or card is presented to the reader therefore and the voice signals generated by a microphone when the ring wearer speaks therein, are automatically analyzed and identified as a result of such alalysis.

8. In addition to effecting the opening of a door lock as described, the signal generated when the ring and/or card is presented to the reader may also be operable to control a motor to open a closed door for a person when the ring and/or card is presented to the reader and radiation field detector.

9. The recepticles 13 for the ring crown portions which are shown in FIGS. 1,4,5,6,7 and 8 may be provided with bristle or brush elements extending thereacross for cleaning or removing dust from the crowns of the rings presented thereto, if necessary, to improve the reading function.

10. The ring crown described may contain one or more magnets of the permanemt or electrically energized types which generate magnetic fields of coded types for activating suitable detection circuits in the pick-up housings which function, as described, in generating enabling signals when proper field detection is effected.

11. In yet another mode of operation, a single photoelectric detector may be employed to read the code of a finger ring for the purpose described by pivotal movement of the crown of the ring in the receptacle by pivoting the hand at the wrist so as to cause the photocell in the reader receptacle to read the code of the ring as the elements thereof are caused to scan past the photocell by such pivotal movement. The output of the photocell is a series code which may be converted to parallel code by a series-to-parallel converter and then presented to the described comparator for generating the described enabling signal. A plurality of such stationary photoelectric detectors such as a bank thereof may also be employed to generate one or more parallel enabling codes as the ring crown is so pivoted to swept past the detectors by moving the hand or pivoting it at the wrist.

12. The auxiliary coded card 20 of FIG. 1 may be replaced by a similar code bearing device such as a housing for a wrist watch wherein the described function for the card may be performed by the code circuits recorded on or within the housing of the watch. The device may comprise a conventional spring wound or electronic wrist watch containing additional active or passive circuits or a circuit of the type described for generating a code when a push button switch is activated, in respose to the pulses generated by the time keeping circuits or when otherwise activated, such as by means of the radiation field described, and means for transmitting such code by short wave or affecting the receiving means for activating the switch or lock opening means described when in the vicinity of the described lock pickup or switch activating circuits described. Such wrist watch support circuit may also be employed as a replacement for the described finger rings in the circuits and systems hereinbefore described and illustrated in the drawings wherein it is merely necessary to bring the watch into the vicinity of the lock detection circuit.

13. Either or both the described coded watch and card or coded finger ring and coded card may be employed to open a normally closed switch, close a normally open switch or operate a flip-flop or bistable switch each time the former is brought into the vicinity of the detector or pickup described, to control a variety of different machines or electrically controlled devices. Either or both may also be used in conjunction with another switch, which may be operated by a conventional key, proximity detector for the person employing the ring or card or other switch operating means for opening a lock or door or operating a machine or motor controlling switch as described when all switches are activated by either providing such switches either in series circuit with each other or connecting same to a logic circuit such as the AND circuits described.

14. The watch containing active or passive circuit(s) described above may be supported within the watch housing containing the watch mechanism or circuits as part of or separate from the watch electronic time keeping circuit or separate therefrom within the housing, in an auxilliary chamber exterior of the watch circuits or on the rear face of the watch housing. For example, a circuit of the type printed on the coded card 20 of FIG. 1 may be printed or otherwise formed on a circular thin card or thin disc and bonded by pressure sensitive adhesive to the rear face of the watch housing for use as described to activate a switch, open a lock or cooperate with the described finger ring or card in effecting such a function or functions.

The use of such a coded circuit containing ring, disc or card may include a number of the described functions for opening a lock or door, deactivating an alarm, gaining access to recorded information, credit verification, personal identification or any other function wherein the coded member may be employed per se to effect the particular function and/or used in combination with one of the other devices (e.g. card, watch circuit, disc or ring) to effect one or more of such functions. The code generating or radiation field modifying circuits provided as described in the card 20 of FIG. 1 may also form part of the described finger rings or watch assemblies for performing the same functions thereof.

15. In yet another form of the invention it is noted that one or more of the code generating means described above and illustrated in the drawings may be employed as described or in modified forms thereof for purposes other than opening a lock or door such as in identifying the bearer of the electronic key, card, ring or watch containing the code generating means for the purpose of completing a transaction, gaining access to recorded information or remotely operating a device such as magnetic recorder-reproduction unit, lock or machine. In one form of such a system, the wearer or holder of the electronic code generating device or coded ring or card may, by closing a read switch of the type described, initiate a transaction or enabling operation which may be effected by communication along wires such as telephone lines extending from one terminal of the system to another containing the device to be activated or controlled. In another form, an audio signal or code may be generated at one telephone terminal and transmitted on a connected line to a second terminal at which the person holding or wearing the ring key or coded card may be located. The signal received from the first terminal may be employed to energize or operate a code reading device such as one of those described for photoelectrically reading the code of the ring and/or generating short wave radiation for energizing the code generating means of the ring or code or the described energy field generator to permit the operation thereof as described in effecting described switch activating or code generating functions, which effects the closure of a switch or other form of machine control at the terminal remote from the key ring wearer.

16. In a modified form of the control system described in 15 above, the terminal of the telephone or communication system at which the ring key or card is presented may include means for converting the code generated when the code elements of the ring or card are read or sensed to audio signals or tone on the connected line so that the code may be transmitted thereby to the terminal of the circuit containing the computer of machine to be controlled or to utilize or record such code signals.

17. In yet another form of the invention, the key king, watch housing, card or other similarly coded device may contain a code generating means for generating a specific tone code signal or group of such signals when activated and converting same to sounds in the vicinity thereof by means of a miniature speaker or transducer supported by the ring, card or watch housing and connected to be modulated or energized by the code signals generated by ther code generating circuit thereof. Such device may be energized by a person wearing or holding same while it is disposed in the vicinity of a telephone mouthpiece to permit the sounds generated thereby to be picked up by the mouthpiece transducer and converted to electrical code signals on the connected telephone circuit wherein such signals are employed at the other terminal to control operation of a machine, recorder, record playing unit or computer for various purposes or to enable the completion of a transaction such as a credit transaction. The receiving terminal for such code signals may be electrically connected to the telephone line or contain acoustically coupled means for converting the tone signals received to sounds and then converted to electrical signals by a suitable transducer which signals are utilized as described in enabling the operation of a machine, recorder or other device as described.

18. In the key and lock opening or switch activating and control systems described above, each subscriber or user of the system may be provided with a key ring, coded card or chip containing optically scannable or electronic code generating means containing a different recording or code generating electronic circuit that the optically scannable or circuits og other subscribers to the system, so that one electronic key or ring will not be capable of opening locks or remotely controlling switches controllable by another key or keys. The following techniques and apparatus are noted which may be employed to easily and rapidly form the described optically scannable code recordings on the ring itself, the rear face of the ring jewel or an insert strip or disc secured behind the jewel as described:

(A) The code may be provided as dots, strips, bars or concentric circles of predetermined widths and separations defining the code and effected by burning or discoloring a substrate to form optically contracting areas thereof or cavities which may be electro-optically scanned by a photoelectric detector or a bank thereof as described. The same code may be recorded by depositing coating material admitted to a laser or electron beam which is intensity modulated and deflection controlled to create the code on the surface being so coded. A ribbon or film containing the material to be deposited when the beam strikes same may be disposed between the beam generator and the surface to be coded.

(B) In the fabrication of electronic keys such as cards or chips containing electronic circuits which generate different electrical or short wave codes when electrically energized as described, a master circuit or series of master circuits may be formed by printing metal and other materials or other wise depositing circuit forming material on the card or ship and an intense radiation beam or beams such as generated by a laser or lasers, electron gun or guns may be intensity modulated or gated on an off and deflection controlled to cause the beam or beams to destroy, inactivate or sever certain circuit components such as interconnects or discrete withching components of the master circuit so as to leave an operating circuit which will generate a desired code when electrically activated or energized. In other words, the master circuit from which the specific code generating circuit is eventually derived is altered in such a manner that certain elements thereof are eliminated from the operating circuit so as to provide a new circuit which is part of the master circuit and which will generate a specific desired code on an output when it is electrically energized.

(C) In yet another fabrication technique, a master circuit or circuit array of switching components is formed by printing or other automatic means which disposes or form discrete circuit elements such as circuit leads close to each other on a substrate and capable of being interconnected thereafter by the selective deposition of conducting material on the substrate such as between film leads or interconnects extending between switching components formed on the substrate. In one form such selective interconnection to form code generating circuits is effected by means of one or more electron or laser beams into which is introduced circuit forming material such as metals, alloys or semiconducting material. The beam or beams may also be formed and directed in such a manner as to cause substrate conducting material to melt and flow between leads or components to effect selected connections of circuits or electrical components formed or otherwise provided on the substrate.

(D) A combination of the techniques described in B and C above may be employed to sever portions of a master circuit and connect other portions to form new code generating circuits.

The techniques described above may be employed to form microminiature circuits from master circuits or patterns of circuit elements other than code generating circuits.

19. In a modified form of the instant invention, a coded ring, card or wrist watch may be carried or worn by a person and may contain a passive electronic circuit or circuits which generates a code when energized by an external field of short wave radiation, as provided for example, by the transmitter and receiver 18 of FIGS. 1 and 18 wherein the received code or alteration in the field generated caused by the presence of the card, ring or chip circuit may be utilized to enable the opening of a lock or closure of a switch by mechanical means such as a manually held key such as a conventional door key or an automobile ignition key inserted into a door lock or receptacle for a key operated ignition switch or other electrical switch adapted to be closed by the turning of such key. In other words the electronic circuit which is provided in the ring, watch housing or card and serves, when in the vicinity of an energy field generator and receiver of the type described, to close a first switch enabling the completion of an electrical circuit when a conventional key is inserted into a switch closing means such as an automobile ignition switch recepticle or any other switch closing key receptacle and is turned therein. The detection of such electronic circuit by a detector of the type described may also be employed to operate a solenoid or motor which drives part of a lock opening mechanism enabling the lock to be opened thereafter by turning a conventional key in the key receptacle of the lock. In the all electrical system which employs two switches one of which is closed by the presence and detection of the coded electrical circuit of the ring, card or watch, the local operation of a motor vehicle or other machine may be effected and maintained only when the circuit is in the vicinity of the detector thereof or the code thereof.

It is noted that the described and illustrated coded finger ring, card or code containing wrist band or watch may be employed in addition to opening a door or lock or energizing an enabling means for the operation of a machine, also as a means for automatically identifying a person for use in business transactions, security systems and the like. For example, if a pickup, as described, is provided for reading the ring contained code when the ring is presented to a receptacle for a reading means such as a housing associated with a transaction terminal, the electrical code signals so generated may be applied to a comparator receiving a code or codes from a master memory or from a reader into which a card, check or transaction slip is inserted which contains the same code and, if an enabling signal is generated, an indicator is energized to permit the transaction to be completed or the check is passed through the reader without rejection. The code signals derived in scanning the ring code may be applied to a computer which also receives signals derived from a microphone when a word or words of the ring wearer are spoken and received by said microphone. The output of the comparator, generated when proper voice-code signals are generated and received by the comparator, may be applied to an alarm indicating that the bearer of the card is the person identified by the card and/or may be employed to enable a transaction to be completed, open a door or lock, or operate a machine or enable such operation upon suitable further control by a person.

It should be understood with respect to all of the embodiments described above that power supplies having the correct polarities and magnitudes are provided, where not indicated in the drawings, so as to supply proper electrical energy for appropriately operating the various illustrated circuits as described in the specification.

I claim:

1. An electrically operated lock system comprising in combination:
   first means for locking and unlocking an access gate,
   second means for operating said first means to cause said first means to unlock said gate,
   said second means including electrically controllable means and a short wave pick-up operatively connected to said electrically controllable means,
   third means including a portable short wave code generating and transmitting means adapted to be carried by a person seeking to open said access gate,
   fourth means connected to said pick-up of said second means and operable for electrically detecting short wave codes generated by said third means, said fourth means being operable to activate said second means to control the operation of said first means,
   said first, second and fourth means being supported on a common support, and
   said third means being automatically operable when carried to a given range of said fourth means to generate a short wave code receivable by said pick-up and detectable by said fourth means for causing said fourth means to generate a control signal for controlling said second means to unlock said gate.

2. A system in accordance with claim 1 wherein said third means includes a housing and means for supporting said housing on the body of a person.

3. A system in accordance with claim 2 wherein said housing is a watch housing and antenna means supported by said housing and connected to short wave radiate said code generated by said third means, and a wristband supporting said watch housing on the wrist of a person.

4. A system in accordance with claim 3 including an electrically operated watch supported within said housing and a battery supported by said housing for powering said watch, said battery also being operable to power said third means to cause it to generate and transmit short wave codes to said fourth means.

5. A system in accordance with claim 1 including fifth means supported adjacent said fourth means for for generating a short wave energy field in the vicinity of said fourth means, said third means including means for receiving energy from said energy field and converting same to electrical energy for powering said code generating means to cause it to generate and short wave transmit said code when said third means is within a given range of said fifth means.

6. A system in accordance with claim 4 wherein electrically operable watch includes electronic circuit means including separate circuits for driving the display of said watch and for powering said third means for generating said short wave code, said electronic circuit means being supported within said housing.

7. A system in accordance with claim 6 wherein said electronic circuit means for driving said display and generating said short wave code are supported on a common support or substrate.

8. An electrical control system comprising:
   an electrically operated device to be controlled,
   means at a fixed location for generating an energy field,
   a support including a wristwatch housing adapted to be worn on a wrist and a band for holding said housing against a wrist of a person,
   a battery and display means powered by electrical energy generated by said battery and supported within said housing for displaying time,
   time signal generating means supported within said housing and powered by said battery,
   first electrical circuit means energized by said battery for generating time signals and means for applying said time signals for energizing said display means to display time,
   second electrical circuit means supported within said housing including code generating means and a short wave transmitting means connected to said code generating means for generating short wave code signals of the code signals generated by said second electrical circuit means,
   electrical energy generating means responseive to the energy of said energy field when within a given range of said energy field for generating electrical energy for energizing said electrical circuit means to cause it to generate and short wave transmit said code, and
   short wave receiving means for receiving said short wave signals, and means responsive to the received code signals for generating a control signal and applying said control signal to control the operation of said electrically operated device.

9. A system in accordance with claim 8 wherein said battery is operable to supply electrical energy for energizing said first and second electrical circuit means and switch means for connecting said battery to said second electrical circuit means when said switch means is closed to cause said second electrical circuit means to generate and short wave transmit said code signal when said support is not within operable range of said energy field.

10. A system in accordance with claim 9 including manually operable control means for connecting said battery to energize said second electrical circuit means to cause it to generate a code and to short wave transmit said code.

* * * * *